(12) United States Patent
Dey

(10) Patent No.: US 6,970,875 B1
(45) Date of Patent: *Nov. 29, 2005

(54) IP LIBRARY MANAGEMENT SYSTEM

(75) Inventor: Aparna Dey, Fremont, CA (US)

(73) Assignee: Synchronicity Software, Inc., Marlborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/622,379

(22) Filed: Jul. 18, 2003

Related U.S. Application Data

(63) Continuation of application No. 09/467,563, filed on Dec. 20, 1999, now Pat. No. 6,687,710.

(60) Provisional application No. 60/219,345, filed on Dec. 3, 1999.

(51) Int. Cl.[7] ............................................. G06F 17/30
(52) U.S. Cl. ........................ 707/100; 707/101; 707/102
(58) Field of Search ................................. 707/100–102

(56) References Cited

U.S. PATENT DOCUMENTS

| | | | | |
|---|---|---|---|---|
| 6,006,332 A | * | 12/1999 | Rabne et al. ............... | 713/201 |
| 6,687,710 B1 | * | 2/2004 | Dey .......................... | 705/36 R |
| 2002/0002524 A1 | * | 1/2002 | Kossovsky et al. ........... | 705/36 |
| 2002/0019836 A1 | * | 2/2002 | Uchio et al. ................ | 707/511 |

* cited by examiner

*Primary Examiner*—Charles Rones
*Assistant Examiner*—Neveen Abel-Jalil
(74) *Attorney, Agent, or Firm*—Wilmer Cutler Pickering Hale and Dorr LLP

(57) ABSTRACT

An IP library management system includes IP data segregated into two separate databases: an IP database for storing virtual component data, and an IP catalog database for storing attributes pertaining to the stored virtual component data. The IP database and IP catalog database are connected over a local area network. An IP database file server acts as the intermediary between the IP database and the local area network, while one or more database servers act as the intermediary between the IP catalog database and the local area network. The local area network may be connected to a wide area network allowing remote access by a number of remote users. The IP library management system provides an IP authoring methodology and an IP integration methodology associated with the two databases. Users may access the IP library management system through a global computer network such as the Internet.

5 Claims, 12 Drawing Sheets

IP LIBRARY MANAGEMENT SYSTEM

RELATED APPLICATION DATA

This application is a continuation of U.S. patent application Ser. No. 09/467,563, which was filed on Dec. 20, 1999, now U.S. Pat. No. 6,687,710 which claims the benefit of U.S. Provisional Patent Application Ser. No. 60/219,345 filed Dec. 3, 1999, hereby incorporated by reference for all purposes as if set forth fully herein.

FIELD OF THE INVENTION

The field of the present invention relates to electronic design automation, and more particularly, to methods and systems for maintaining information relating to virtual components and associated meta-data used in chip design.

BACKGROUND OF THE INVENTION

Silicon technology has advanced such that designers must commonly design chips consisting of millions of transistors. Because of these advances in technology and increasing time to market pressure, designers are developing entire electronic systems or subsystems on a single chip, as opposed to spreading out the design over multiple chips. For example, a subsystem design for a cellular phone may contain a micro-controller as well as a digital signal processor and other components all on a single chip (typically an application-specific integrated circuit or ASIC) or portion of a single chip. These subsystem designs, when stored as design data and supporting documentation for use with electronic design automation (EDA) tools on a computer workstation in a "virtual socket" design environment, are sometimes referred to as "cores" or "virtual components" ("VCs").

After testing and verifying the design for the components within an overall system, the subsystem designs can often be reused in other application areas—for instance, the micro-controller used in the cellular phone ASIC example above could also potentially be used in a chip used in an automotive application. It could be very costly, wasteful and inefficient if these subsystem designs (i.e., cores) were redesigned for every new application. Design reuse of these cores, also commonly referred to as "IP" or "IPs" (short for "Intellectual Property" or "Intellectual Properties," respectively), would allow designers to become more efficient and foster a market for existing design cores which is applicable to more than one application.

While the novelty of treating IPs as marketable commodities is such that associated terminology is still evolving, some standardization has been achieved. For example, the Virtual Socket Interface Alliance (VSIA) is an organization formed to specify open standards for VCs, permitting the reuse of cores from multiple sources on a single integrated circuit (IC) or chip. In an analogy to how discrete ICs fit into sockets on a printed circuit board, the VCs may be viewed, as "integrated" into "virtual sockets" in an IC design; hence, the title of the VSIA organization. Using the open standards of the VSIA, it is hoped by the participants that IP from different sources can be quickly integrated at the functional, logical and physical levels. The virtual components, or VCs, can take on many forms—i.e., they can be either system level macros, megacell, or embedded software cores used in system chip design. VCs can generally be categorized according to the different abstract levels of design used to captured them (which also dictates to some extent the manner in which they are stored). For example, a hardware VC such as megacell could be either captured in the form of a functional description in a standard functional language such as HDL (Hardware Description Language), a physical abstraction in a standard physical abstraction language such as GDSII, or layout data. Similarly, an embedded software VC can be stored in the form of either source code or executable code. This flexibility helps the user reuse VCs in the abstraction level he or she may want.

Because of the advantages gained by users in reusing virtual components so as to meet the demands of increasing design complexity and time to reaching the market, IP databases or repositories have been developed to accumulate core designs for reuse. However a mere repository provides no assurances that the core designs stored meet applicable standards, nor does such a repository necessarily provide ease of and control over access and use.

Thus, there is a need for a distributed database providing an infrastructure for electronic design that users can access remotely and conveniently, and which provides assurances of quality and a measure of security.

SUMMARY OF THE INVENTION

The present invention provides in one aspect an IP library management system useful for electronic design automation applications.

In a preferred embodiment, the IP library management system supports users on a plurality of local area networks coupled through a wide area network such as the Internet. In accordance with one embodiment as disclosed herein, the IP library management system can utilize a client-server system configuration which includes a master IP database for storing virtual component design data, coupled to a master IP database server on a local area network. A catalog database server may also be provided on the local area network, and couples to an IP catalog database for storing attributes pertaining to the stored virtual component data. The IP library management system further preferably includes an IP registration system, an IP data management system, an IP selection system, an IP catalog management system, and an IP modification management system, which reside on an application server.

In a preferred embodiment, the IP registration system tests the quality of new or modified virtual component data for reuse according to standard guidelines—for example, VSIA standards. If the new or modified virtual component data meets the standards, the IP registration system enters the new or modified data into the master IP database.

In a preferred embodiment, the IP management system controls whether a user may access the master IP database and the IP catalog database. In addition, the IP management system preferably controls setup and maintenance of the master IP database and updates the master IP database upon the registration of new or modified virtual component data.

In a preferred embodiment, the IP selection system permits browsing of the IP catalog database by means of a query engine, and allows access of selected virtual component data from the master IP database, and transport thereof to the user's work area on his workstation.

In a preferred embodiment, the IP catalog management system manages the setup of the IP catalog database schema and any updates to the IP catalog database.

In a preferred embodiment, the IP modification management system manages the reporting and tracking of errors or issues detected in the virtual component data.

Other aspects and advantages of the present invention are disclosed by the following description and figures.

DESCRIPTION OF THE DRAWINGS

The various aspects and features of the present invention may be better understood by examining the accompanying figures, wherein.

DETAILED DESCRIPTION OF THE INVENTION

Figure 2:
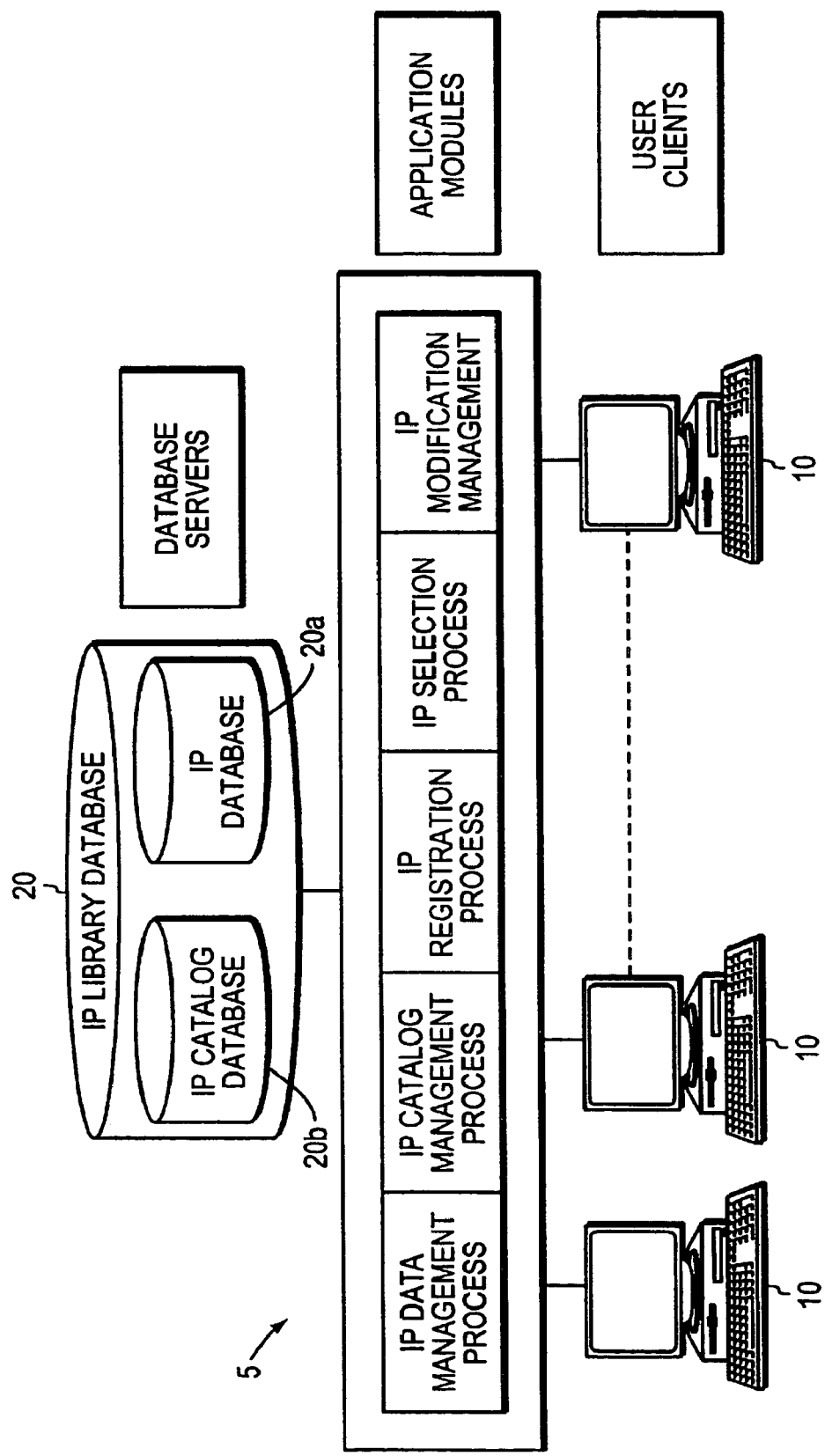
FIG. 2 is an illustration of a system architecture for an IP library management system.

FIG. 2 is a top-level diagram of a preferred system architecture for an IP library management system in accordance with one or more embodiments as disclosed herein, details of which are illustrated in some of the other figures and/or described in the accompanying text. The general system architecture illustrated in FIG. 2 is mapped to a 3-tier client/server database distribution system. As shown in FIG. 2, an IP library management system 5 connects to an IP library database 20, which comprises an IP database 20a and an IP catalog database 20b, details of which are described later herein, as well as a database server. The IP library management system 5 preferably comprises five main modules, namely an IP data management system 30, an IP selection system 15, an IP registration system 40, an IP catalog management system 25, and an IP modification system 35. These modules are preferably embodied as platform-independent programs residing on an application server which is part of the IP library management system 5.

Figure 1:
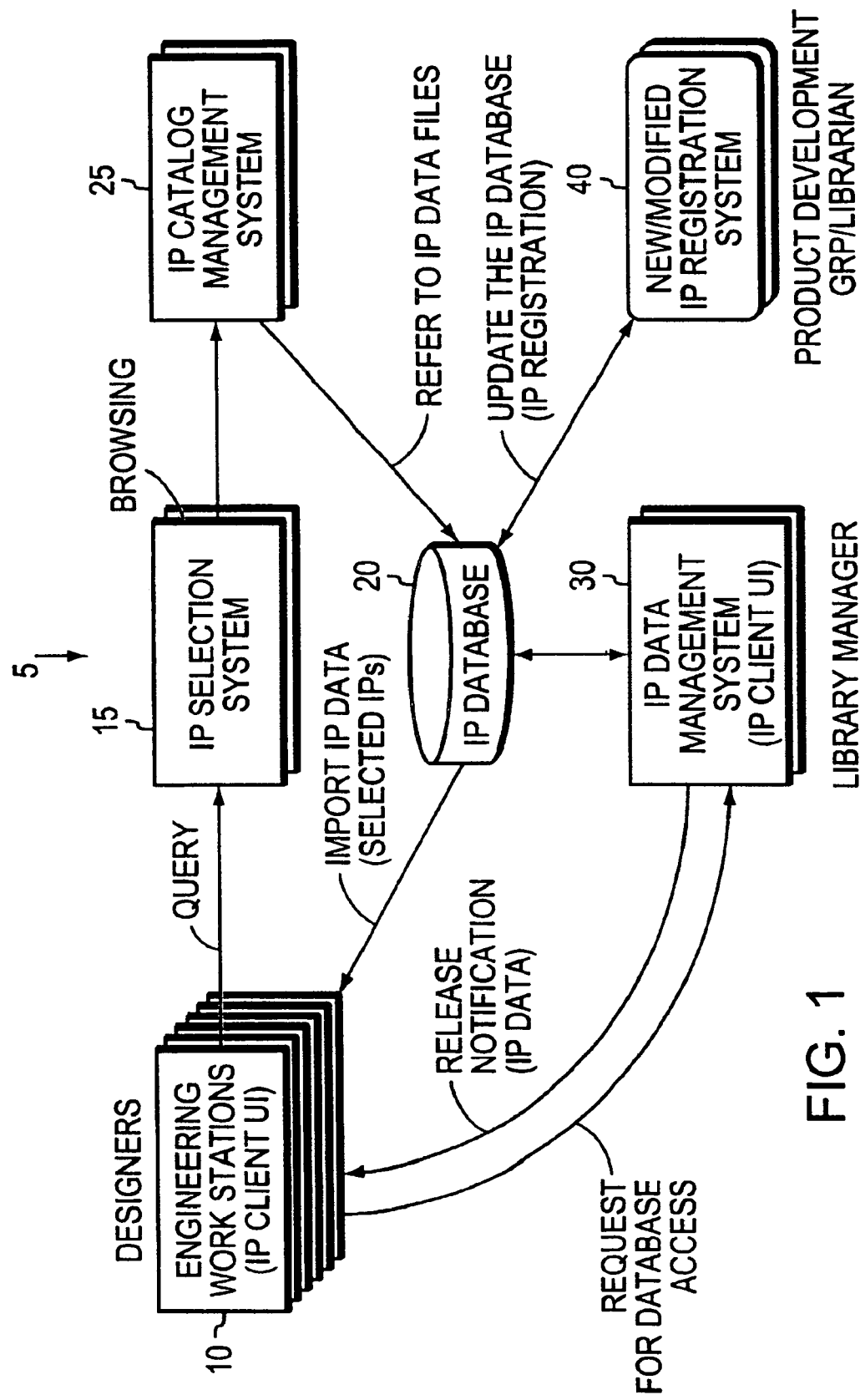
FIG. 1 is a top-level system diagram of an IP library management system according to one embodiment as disclosed herein.

Designers at engineering workstations 10 (including, for example; personal computers or terminals connected to a local network) may access the IP library database 20 through the IP library management system 5. Users may access the IP library database 20 through client modules at their workstations 10, which, if remotely located, may be linked to a web access program on their workstations 10 to allow access over an electronic network such as, e.g., the Internet. An example of interactions of some of the various modules shown in FIG. 2 is illustrated in FIG. 1, and described hereafter.

In one embodiment, the IP database 20a comprises a set of packaged files which are stored within a database server system. The database server system of the IP library database 20 may comprise one or more Unix®-compatible server computer systems, thereby allowing design data within the IP database 20a to be stored in Unix®-compatible file packages. The IP library database 20 is preferably backed up by one or more RAID disk servers to allow availability of the information within database in case of main database system failure. Users may access the IP library database 20 via the IP library management system 5 in order to browse, select or register new or modified IPs.

Figure 11:
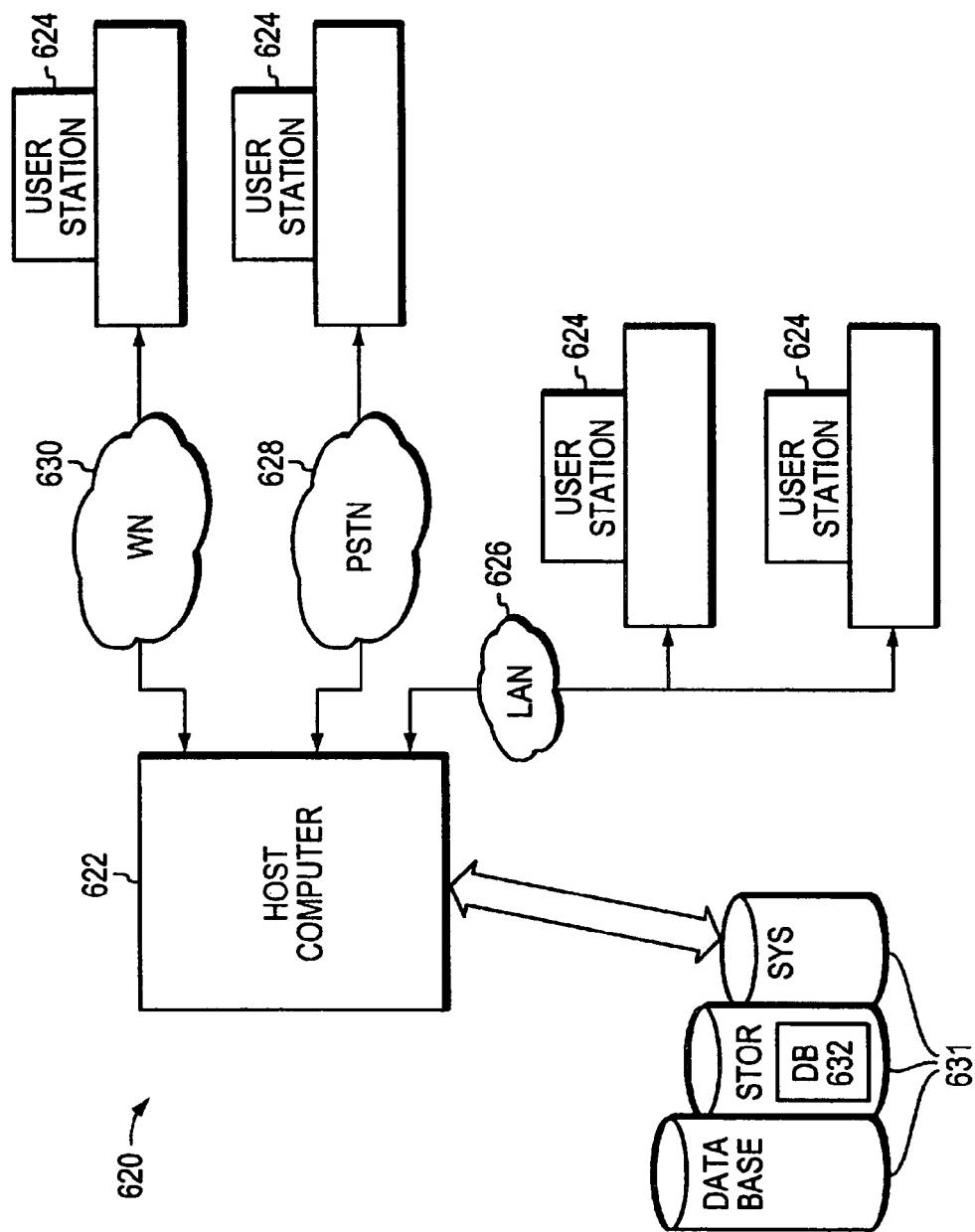
FIG. 11 is an illustration of an overview of a computer system architecture in accordance with various embodiments of the invention.
Figure 12:
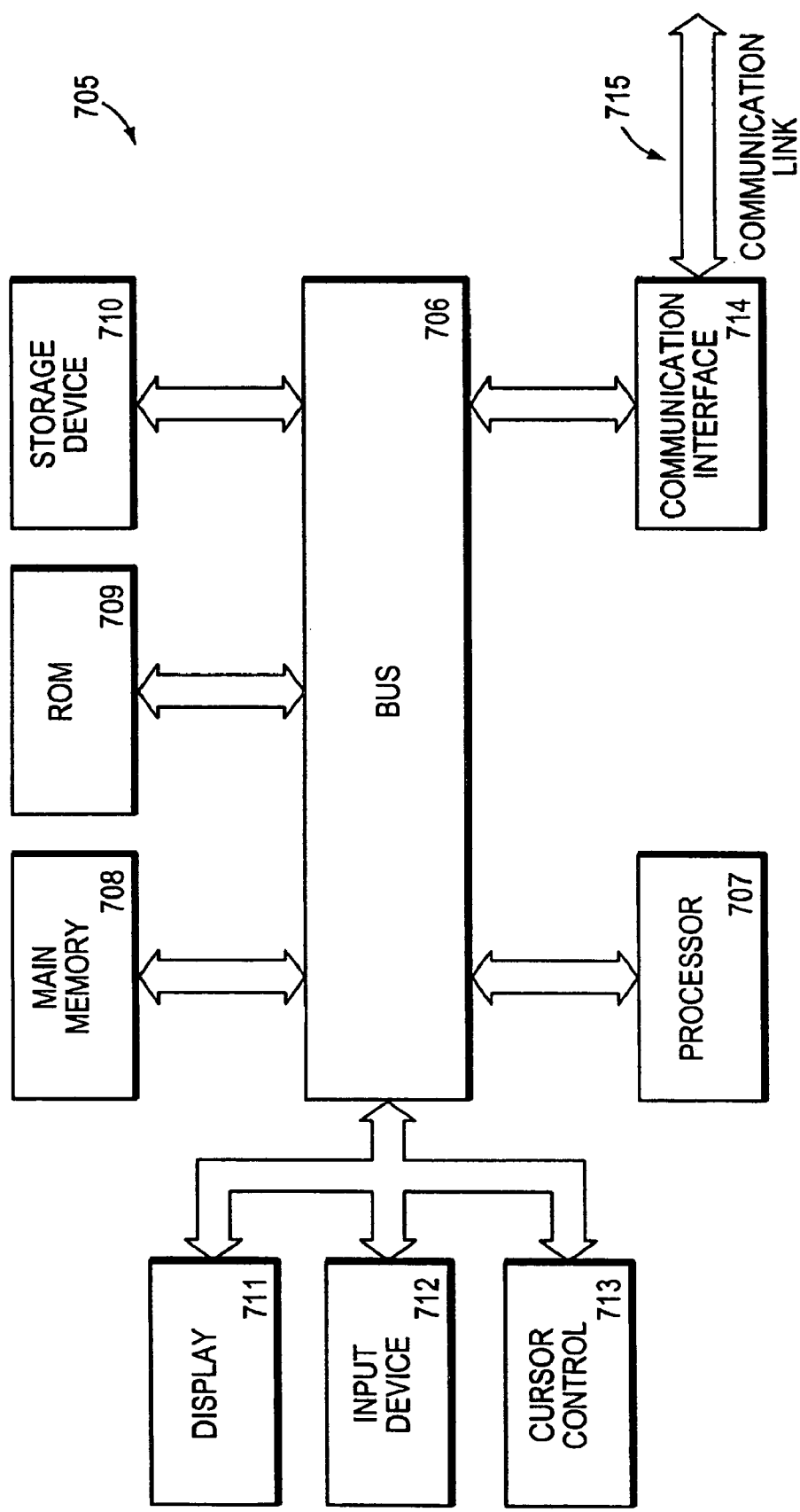
FIG. 12 is an illustration of an overview of a general architecture that may be applicable to one or more features of the various systems discussed herein.

The IP library database 20 ad IP library management system 5 may be implemented using any of a wide variety of computer systems and architectures. FIG. 11 illustrates an overview of a computer system architecture in accordance with various embodiments of the invention, while FIG. 12 illustrates an overview of a general architecture that may be applicable to one or more features of the various systems discussed herein. Referring first to FIG. 11, a computer system 620 may include a host computer 622 connected to a plurality of individual user stations 624. The user stations 624 may each comprise suitable data terminals, for example, but not limited to, personal computers, portable laptop computers, or personal data assistants ("PDAs), which can store and independently run one or more applications, i.e., programs. For purposes of illustration, some of the user stations 624 are connected to the host computer 622 via a local area network ("LAN") 626. Other user stations 624 are remotely connected to the host computer 622 via a public telephone switched network ("PSTN") 628 and/or a wireless network 630.

The host computer 622 may operate in conjunction with a data storage system 631, wherein the data storage system 631 contains a database 632 that is readily accessible by the host computer 622.

Alternatively, the database 632 may be resident on the host computer, stored, e.g., in the host computer's ROM, PROM, EPROM, or any other memory chip, and/or its hard disk. In yet another alternative, the database 632 may be read by the host computer 622 from one or more floppy disks, flexible disks, magnetic tapes, any other magnetic medium, CD-ROMs, any, other optical medium, punchcards, papertape, or any other physical medium with patterns of holes, or any other medium from which a computer can read. The host computer 622 may access two or more databases 632, stored in a variety of these mediums.

Referring to FIG. 12, each user station 624 and the host computer 622, each referred to generally as a processing unit, may embody a general architecture 705. A processing unit may include a bus 706 or other communication mechanism for communicating instructions, messages and data, collectively, information, and one or more processors 707 coupled with the bus 706 for processing information. A processing unit may also include a, main memory 708, such as a random access memory ("RAM") or other dynamic storage device, coup led to the bus 706 for, storing dynamic data and instructions to be executed by the processor(s) 707. The main memory 708 also may be used for storing temporary data, ie., variables, or other intermediate information during execution of instructions by the processor(s) 707.

A processing unit may further include a read only memory (ROM) 709 or other static storage device coupled to the bus 706 for storing static data and instructions for the processor(s) 707. A storage device 710, such as a magnetic disk or optical disk, may also be provided and coupled to the bus 706 for storing data and instructions for the processor(s) 707.

A processing unit may be coupled via the bus 706 to a display device 711, such as, but not limited to, a cathode ray tube ("CRT"), for displaying information to a user. An input device 712, including alphanumeric and other keys, is coupled to the bus 706 for communicating information and command selections to the processor(s) 707. Another type of user input device may include a cursor control 713, such as, but not limited to, a mouse, a trackball, a fingerpad, or cursor direction keys, for communicating direction information and command selections to the processor(s) 707 and for controlling cursor movement on the display 711.

The individual processing units may perform specific operations by their respective processor(s) 707 executing one or more sequences of one or more instructions contained in the main memory 708. Such instructions may be read into the main memory 708 from another computer-usable medium, such as the ROM 709 or the storage device 710. Execution of the sequences of instructions contained in the main memory 708 causes the processor(s) 707 to perform the processes described herein. Alternatively, hard-wired circuitry may be used in place of or in combination with software instructions to implement the invention.

The term "computer-usable medium," as used herein, refers to any medium that provides information or is usable by the processor(s) 707. Such a medium may take many forms, including, but not limited to, non-volatile, volatile and transmission media. Non-volatile media, i.e., media that can retain information in the absence of power, includes the ROM 709. Volatile media, i.e., media that can not retain information in the absence of power, includes the main memory 708. Transmission media includes coaxial cables, copper wire and fiber optics, including the wires that comprise the bus 706. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 707 can retrieve information.

Various forms of computer-usable media may be involved in providing one or more sequences of one or more instructions to the processor(s) 707 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 706 may receive the infrared signals and place the instructions therein on the bus 706. The bus 706 may carry the instructions to the main memory 708, from which the processor(s) 707 thereafter retrieves and executes the instructions. The instructions received by the main memory 708 may optionally be stored on the storage device 710, either before or after their execution by the processor(s) 707.

Each processing unit may also include a communication interface 714 coupled to the bus 706. The communication interface 714 provides two-way communication between the respective user stations 624 and the host computer 622. The communication interface 714 of a respective processing unit transmits and receives electrical electromagnetic or optical signals that include data streams representing various types of information, including instructions, messages and data.

A communication link 715 links a respective user station 624 and a host computer 622. The communication link 715 may be a LAN 626, in which case the communication interface 714 may be a LAN card. Alternatively, the communication link 715 may be a PSTN 628, in which case the communication interface 714 may be an integrated services digital network ("ISDN") card or a modem. Also, as a further alternative, the communication link 715 may be a wireless network 630.

A processing unit may transmit and receive messages, data, and instructions, including program, i.e., application, code, through its respective communication link 715 and communication interface 714. Received program code may be executed by the respective processor(s) 707 as it is received, and/or stored in the storage device 710, or other associated non-volatile media, for later execution. In this manner, a processing unit may receive messages, data and/or program code in the form of a carrier wave.

An example of interactions among the modules shown in FIG. 2 is illustrated in FIG. 1. As shown in FIG. 1, designers at engineering workstations 10 may browse the IP database 20 to find VCs (i.e., virtual circuits) of interest by sending a query to an IP selection system 15. Because a designer during such a browse would presumably have initial interest primarily in the attributes (or metadata) of a given VC, it could be quite inefficient to search the raw IP data to locate virtual components to suit the designer's needs. Therefore, in the preferred system illustrated in FIGS. 1 and 2, the raw IP, data is preferably segregated into two separate databases: an IP catalog database 20b for storing IP attributes (for example, boundary and timing properties of a given VC, or datasheet information, all of which may be generally categorized as "metdata"), and an IP database 20a for stoning the bulk of the IP data. IP data for a given VC stored in the IP database 20a will usually comprise many different files, including, for example, a netlist, a layout file, and an HDL description for a given VC. The IP catalog database 20b would typically be expected (given current design sizes) to contain up to 5 kilobytes of attribute data per VC. In contrast, the IP database 20a would typically be expected (for current design sizes) to contain up to 300 megabytes of data per VC.

Table 1 below illustrates the type of data that may be packaged and stored in the IP database 20a:

TABLE 1

| IP Model | Data Abstract | Soft | Firm | Hard |
|---|---|---|---|---|
| Functional Model | Verilog RTL | X | X | X |
| Bus Functional Model | Verilog RTL | X | X | X |

TABLE 1-continued

| IP Model | Data Abstract | Soft | Firm | Hard |
|---|---|---|---|---|
| Synthesis Constraints | Synopsys Scripts, ASCII | X | X | |
| Floor-Plan Wiring Constraints | PDEF, DEF | | X | |
| Floor-Plan Placement Constraints | PDEF, DEF | | X | |
| IP Block Pin Attributes | LEF, ASCII (clock, power, test pins) | | | X |
| Timing Characteristics | Synopsys NLDM, TLF | | X | X |
| Manufacturing Test Vectors | Verilog, WGL | X | X | X |
| Functional Test Bench | Verilog | X | X | X |
| Layout | Abstract, GDSII | | | X |
| Spice Netlist | Spice | | | X |
| Gate-Level Netlist | Verilog | X | X | X |
| Power Model | TBD | X | X | X |
| Embedded software | Source Data, executables | | | |

In Table I, the "IP model" category indicates the type of virtual component or IP, the "Data Abstract" category indicates the file type for the particular IP model, and the Soft", "Firm" and "Hard" categories indicate what type of form the VC data is stored in. These terms are explained in more detail below.

As the data in the IP catalog database 20b comprises primarily (or solely) metadata, the IP catalog database server may be centralized without affecting access response time, which would generally not be possible if the metadata in the IP catalog database 20b were not separated from the IP database 20a. Most searching and browsing for IPs by a user can be done on the IP catalog database 20b, typically through an interactive search and browsing process. Various search modes can be employed, such as keyword searching, category searching, index searching or parametric searching. Users can include circuit designers or architects looking for specific IP data (e.g., technical specifications of the IP), or sales or marketing personnel, third party clients, or project managers. Users can perform a search operation on the IP catalog database 20b through user client applications residing on their workstations 10, and the results of any searching and browsing operations can be limited by the access rights of the user. Once the IP or group of IPs is found by a search on the IP catalog database 20b, the user may retrieve the bulk of the corresponding IP data from the associated records in the IP database 20a.

In the illustration of FIG. 1, the IP catalog database 20b and IP database 20a are not shown as separated within IP library database 20. This characteristic of FIG. 1 is for illustration convenience, however, because as illustrated in FIGS. 2 and 3, for example, and explained hereinafter, each database (i.e., the IP catalog database 20b and the IP database 20a) preferably has its own separate database server and disk storage subsystem.

Returning for the moment to FIG. 1, after selecting a VC of interest from the IP library database 20, the user may import IP data relating to the VC from the IP library database 20 to his or her engineering workstation 10. After modification of this IP data, if any, the designer may decide to register the modified IP data back into the IP library database 20. Alternatively, the designer may have designed an entirely new VC and want to register this new IP data into the IP library database 20. To manage the registration into the IP library database 20 and provide an IP authoring methodology, an IP registration system 35 preferably controls the registration of new or modified IP data into the IP library database 20, after testing that the IP data is qualified (by, for example, checking against VSIA standards or other such standards).

As further illustrated by the information flow depicted in FIG. 1, upon registration of new or modified IP data, the IP data management system 30 of the IP library management system 5 manages a release and version control of the IP library database 20. In addition, the IP data management system 30 controls initial IP database setup and maintenance, and also controls user access (i.e., requires proper user authority) to the IP library database 20. With respect to the other modules illustrated in FIGS. 1 and 2, the IP catalog management system 25 manages the IP catalog database 20b by specifying field categories (attributes or metadata) for each VC, and by updating the IP catalog database 20b whenever there is an addition or deletion to the IP database 20a. The IP modification system 35 (shown in FIG. 2) controls the tracking of "bugs" or problems associated with each VC after use or implementation.

Figure 3:
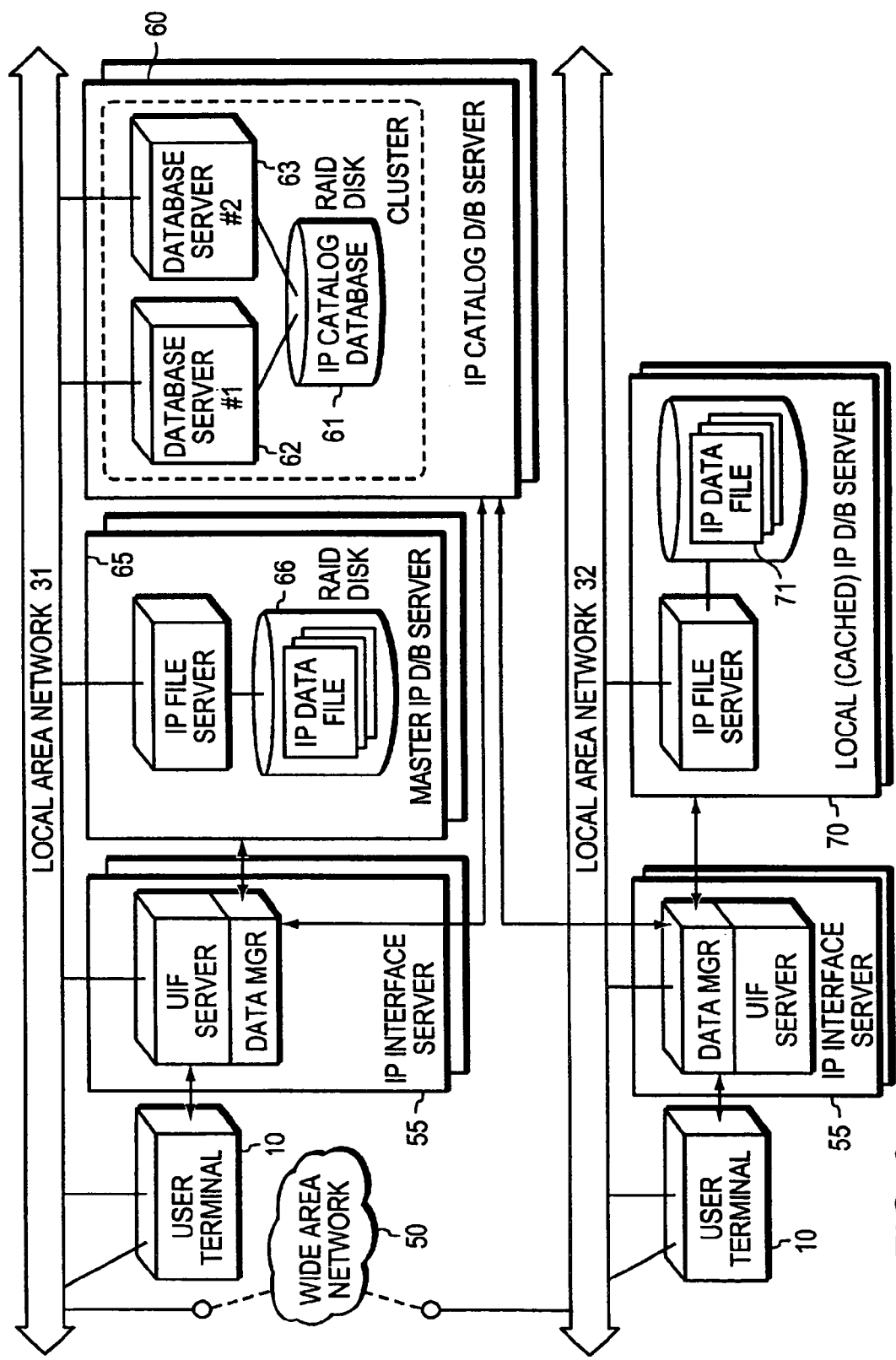
FIG. 3 is an illustration of the IP library management system having a multi-tier client/server configuration.

To allow users at the workstations 10 to access the IP management system 5 through a web browser, the IP library management system 5 preferably is constructed according to a three-tier client/server system architecture, an embodiment of which is illustrated in FIG. 3. In the example illustrated in FIG. 3, an IP catalog database 61 and an IP database 66 are served by different file or database servers. In one aspect the IP catalog database 61 and IP database 66 may correspond to the IP catalog database 20b and IP database 20a of the IP library database 20 depicted in FIG. 1.

In the system architecture of FIG. 3, users at workstations 10 connect to one of a plurality of local area networks (LANs) 11 and 12. The LANs 11 and 12 connect to one another through a wide area network 50. The illustration of two local area networks in FIG. 3 is arbitrary, as the actual number of local area networks served by the IP library management system 5 may be any reasonable number, being limited essentially by the capabilities of the wide area network 50. Because of the global reach and standardized nature of the Internet, the wide area network 50 is will be assumed to be the Internet in the following discussion, although the system would be workable with other types of wide area networks as well.

Each local area network 11, 12 preferably has an IP interface server 55 comprising a user/interface server and data manager. The IP interface servers 55 couple to the various data servers shown in FIG. 3. In a preferred embodiment, each IP interface server 55, regardless of which local area network 11 or 12 it resides on, couples to an IP catalog database server 60 over one of the local area networks (e.g., LAN 11). Users on LANs (e.g., LAN 12) other than the LAN 11 coupled to the IP catalog database server 60 couple through their respective IP interface server 55 to the IP catalog database server 60 through the wide area network 50 (e.g., Internet). The IP catalog database server 60 connects to an IP catalog database 61 (such as, for example, IP catalog database 20b depicted in FIG. 1). Because of the relatively small size of the attribute data for a given VC within the IP catalog database 61, users should experience little delay while attribute data for the VC, retrieved from the IP catalog database 61, is transmitted over the Internet.

The IP catalog database 61 is preferably stored on a Redundant Array of Independent Disks ("RAID") subsystem. The IP catalog database server 60 preferably comprises a cluster server having a first server 62 and a second server 63 coupled to the IP catalog database 61. Such a centralized location is not necessarily desirable for the bulk of the VC data, however, because of the relatively large amount of data for a given VC, and, hence, the collectively massive amount of data for all VCs stored on the IP library database. Users on LANs (e.g., LAN 12) other than the first LAN 11 might experience considerable delay while data for a VC of interest was downloaded over the Internet. To reduce the possibility of such delay, a master IP database server 65 on the first LAN 11 couples to a master IP database 66, which, like the IP catalog database 61, also preferably constitutes a RAID subsystem. Users on other LANs (such as LAN 12) each preferably have a local IP database server 70 that couples to a local cached IP database 71. After browsing the IP catalog database 61 and identifying a VC of interest, the bulk of the VC data is transferred from the master IP database 66 over the Internet to the local cached IP database 71.

In a preferred embodiment, the master IP database 66 may contain VC data in "soft", "firm", or "hard" IP form as well as in any combination of these three forms. According to VSIA terminology, a "soft" IP is delivered in the form of synthesizable hardware description language ("HDL"). A "firm" IP has been optimized on a library including possibly hard blocks or blocks generated by parameterized generators. A "hard" IP has been optimized at the lowest level for area, power, timing, etc. and is typically delivered through a format such as GDSII. Regardless of the form of the data, the data within the master IP database 66 is preferably compressed or packed to save memory. Upon being transferred to a local cached IP database, the data is unpacked.

Figure 4:
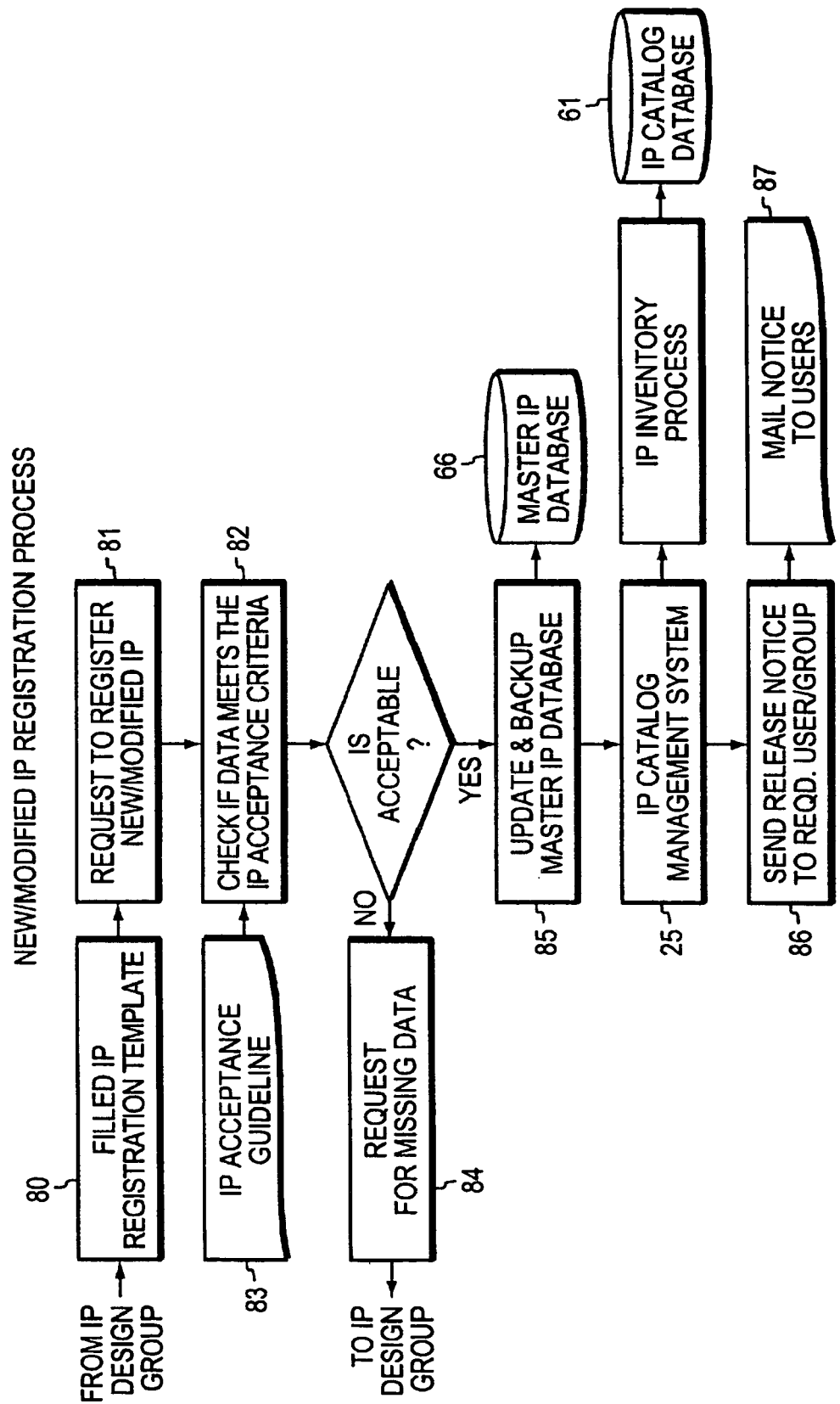
FIG. 4 is a flowchart for an IP registration process that may be managed by the IP registration system.

Further details of the processes performed by the various systems or subsystems within the various embodiments will now be explained. Turning to FIG. 4, a flowchart depicting an IP registration process managed by the IP registration system 40 is illustrated. According to the flow chart shown in FIG. 5, after a user in an IP design group has created a new virtual component design or modified an old virtual component design, the data may be entered into the IP library management system. To initiate this process, the user enters appropriate information in an IP registration template 80, which may be embodied as a user interface form (UIF). The user then places a request at step 81 to register the IP data. The IP registration system 40 then checks if the IP data meets IP acceptance criteria at step 82 using a stored set of IP acceptance guidelines 83. These guidelines are preferably as established by the VSIA. If the IP data does not meet the guidelines, a request 84 is made by the IP registration system 40 to the user to supply any missing data. If the IP data does meet the guidelines, the IP registration system 40 updates the master IP database 66 and a backup master IP database (not illustrated) at step 85. Because the master IP database 66 has thus been altered, the IP catalog database 61 (or 20b in FIG. 1) is modified by the IP catalog management system 25. The IP catalog management system 25 performs an update process as explained further with respect to FIG. 6 to update the IP catalog database 61. Finally, at step 86, the IP registration system 40 sends a release notice to the various affected users by sending (e.g., e-mailing) a notice 87 to these users.

Figure 5:
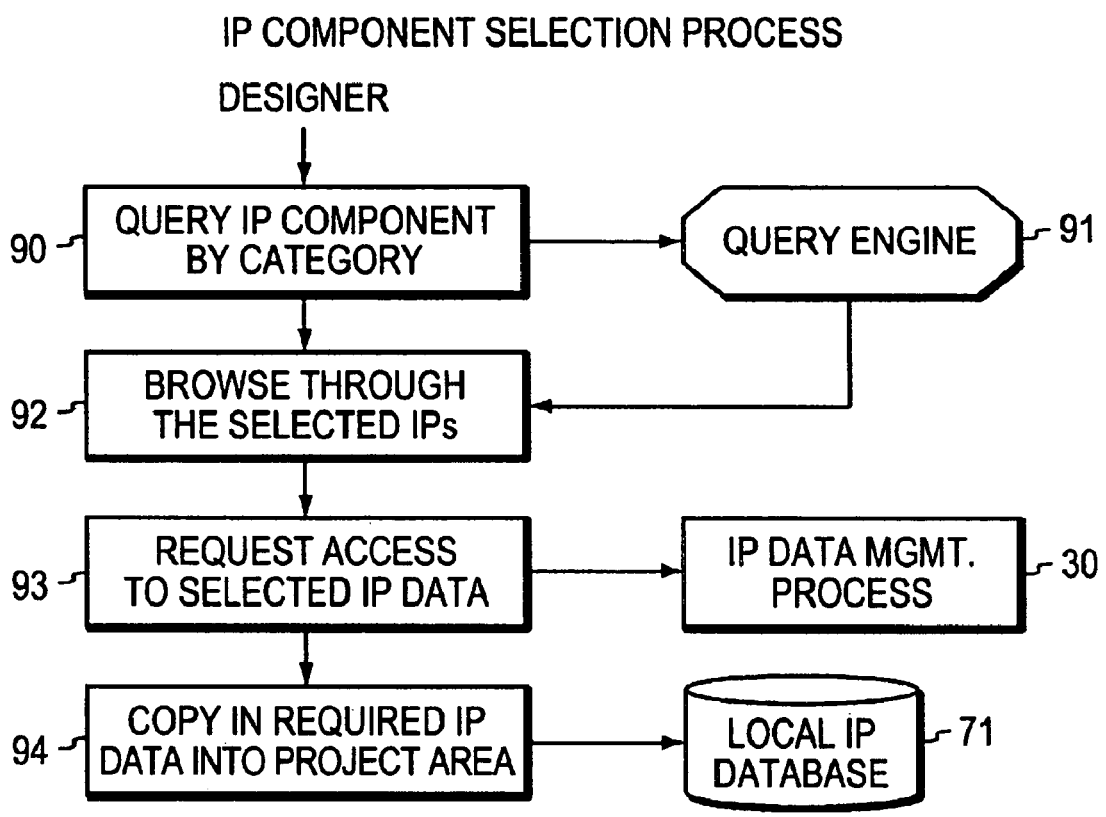
FIG. 5 is a flowchart for an IP component selection process that may be managed by the IP component selection system.
Figure 6:
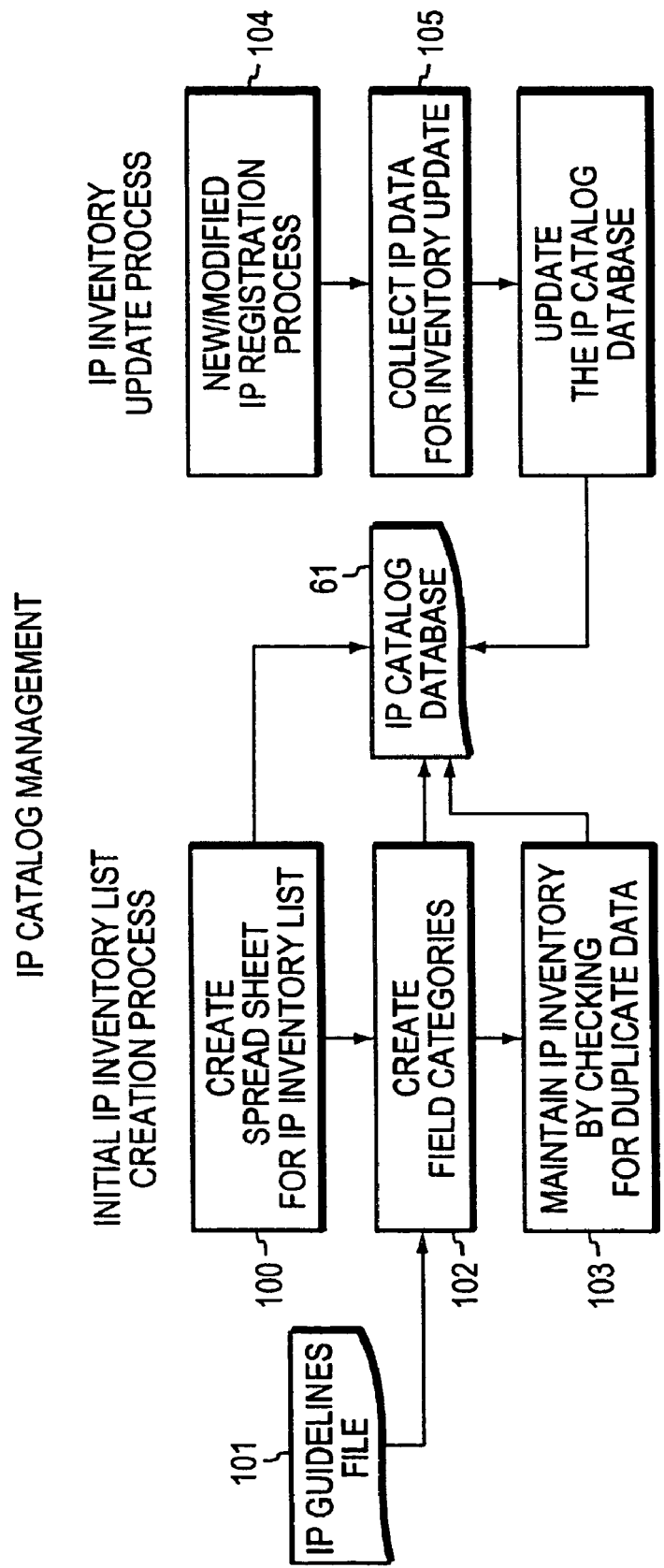
FIG. 6 is a flowchart for an IP catalog database creation and update process that may be managed by the IP catalog management system.

Turning now to FIG. 5, a process managed by the IP component selection system 15 is illustrated. Once a designer has decided upon the particular attributes a VC of interest should have, the designer may initiate a query for IP data associated with these attributes at step 90. The IP component selection system 25 invokes a query engine 91 to browse through the IP catalog database for these attributes at step 92. In one embodiment, the query engine uses SQL commands to operate on an Oracle-based IP catalog database. Should this browsing step identify IP data having the required attributes, the IP component selection system requests access to the selected IP data at step 93. This access is control led by the IP data management system 30, through the process illustrated in FIG. 10. If the user is permitted access, the IP component selection system copies the required IP data into the local cached IP database 71 at step 94.

A flowchart for the IP catalog database creation and update process as managed by the IP catalog management system. The IP catalog database 61 is created beginning at step 100, wherein the IP data is entered into a spreadsheet. Using the IP guidelines file 101, which determines what type of attributes should be attached to a given IP, the IP catalog management system creates the field categories at step 102. In one embodiment, the IP guidelines file 101 is as established by the VSIA. Then the field categories (or attributes) are loaded into the IP catalog database 61. The IP catalog database 61 is maintained by checking for duplicate data entries at step 103.

After creation of the IP catalog database 61, the IP catalog should be modified upon the addition of IP data or modification of existing IP data by designers. The registration of the new or modified IP data occurs in the IP registration process 104 as explained with respect to FIG. 4. The IP catalog management system 25 then collects the IP data at step 105 and updates the IP catalog database 61 with the corresponding attributes at step 106. Note that no reference to the IP guidelines file 101 may be made because the IP registration system 40 has already checked whether the IP data meets IP acceptance criteria (see FIG. 4).

Figure 7:
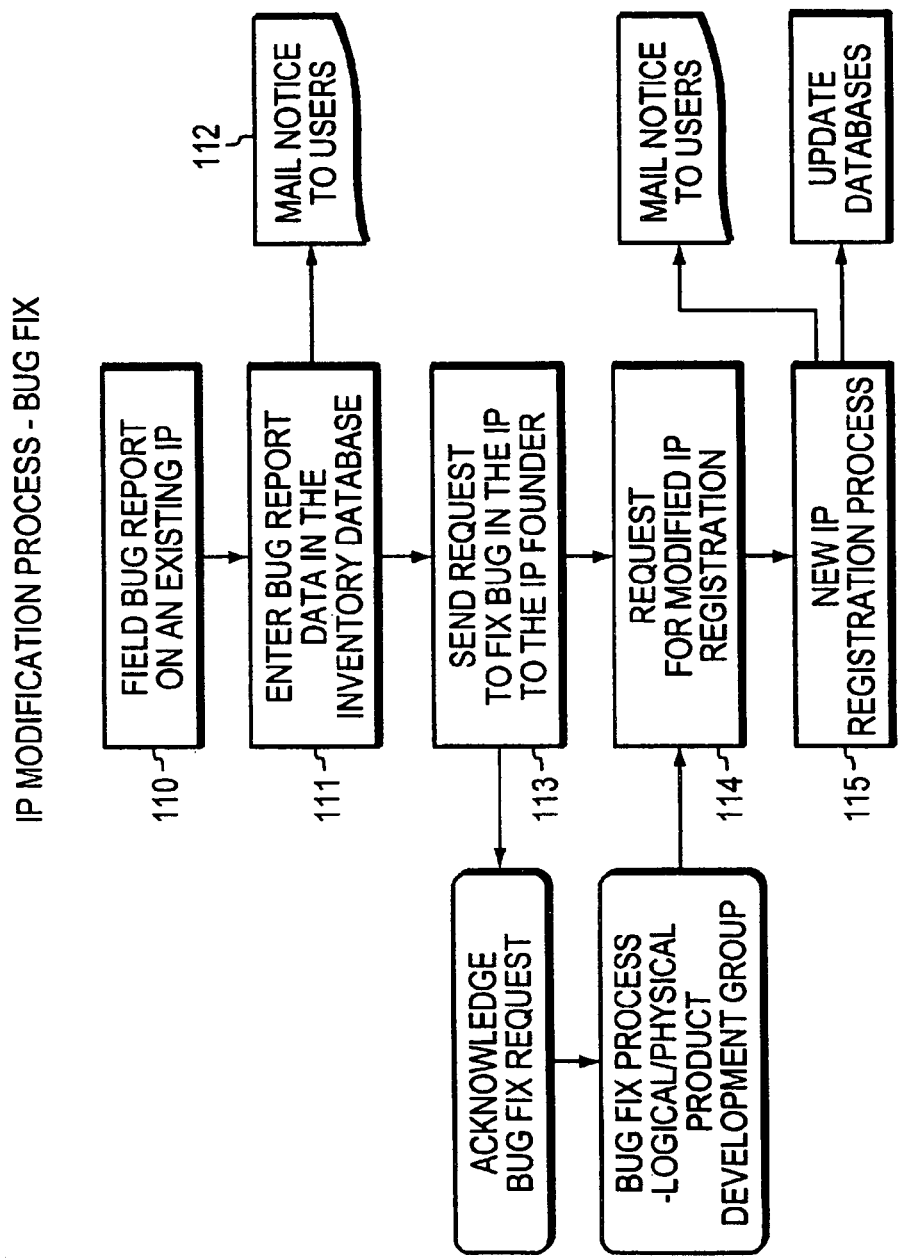
FIG. 7 is a flowchart for a bug fixing process that may be managed by the IP modification system.

Although the IP registration system 40 checks whether the IP data meets IP acceptance criteria, only through testing by the user (such as through emulation or simulation) can the user discover underlying problems or "bugs" in the design of a particular IP. Turning now to FIG. 7, a bug fixing or IP modification process managed by the IP modification system 35 is illustrated. Beginning at step 110, a user initiates a field bug report on an existing IP. The IP modification system then enters the bug report into the master IP database at step 111 and e-mails a notice 112 to the affected users. By entering the bug report into the master IP database, the IP modification system 35 warns other users that this particular IP has problems. Then, a request to fix the bug is sent to the designer of this particular IP at step 113. After the designer performs the necessary redesign, a request is made to register the resulting modified IP data at step 114. The IP registration system 40 registers this modified IP at step 115 as described with respect to FIG. 4, resulting in an update to the master IP database 66 and the IP catalog database 61 and a notice (e.g., an e-mail message) being sent to the affected users.

Figure 8:
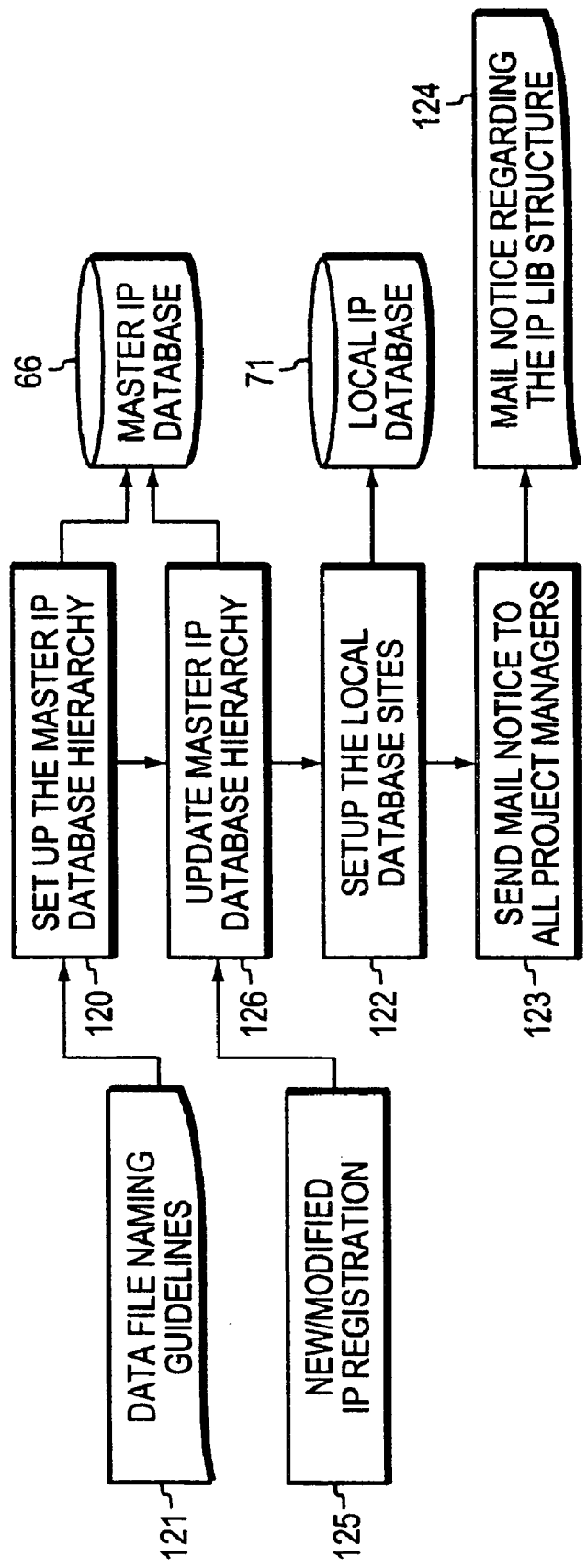
FIG. 8 is a flowchart for an initial setup and update process as may be performed by the IP data management system.

As discussed herein, the IP data management system 30 manages the initial setup and update process of the master and local IP databases. Turning now to FIG. 8, a flow chart for this process is illustrated. At step 120, the IP data management system 30 sets up the master IP database hierarchy within the master IP database 66 using data file naming guidelines 121. This hierarchy is necessary because of the numerous files associated with each VC. The hierarchy provides a uniform directory structure for these files. In one embodiment the data file naming guidelines 121 are as specified by the VSIA. At step 122, the IP management system 30 sets up the local IP databases 71 according to the hierarchy established in step 120. Then at step 122, the IP management system 30 sends (e.g., e-mails) a notice 124 regarding the IP hierarchy to all the project managers. If new IP or modified IP is being registered at step 125, the master IP database hierarchy is preferably altered accordingly at step 126.

Figure 9:
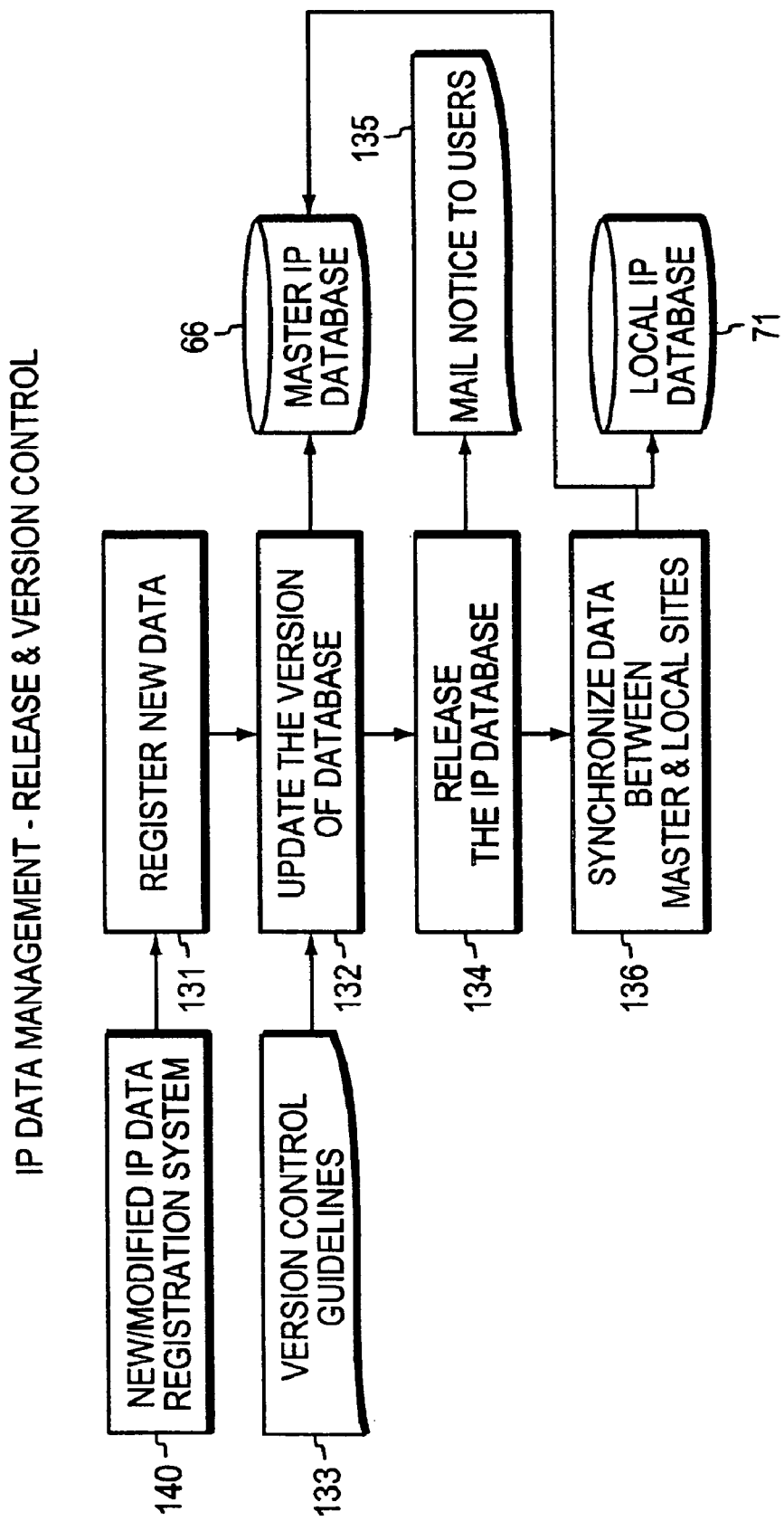
FIG. 9 is a flowchart of a release and version control application as may be managed by the IP management system.

In addition, the IP data management system 30 may automatically create a new release to, for example, all the involved users of a product once a major design has been completed or a major modification has been done. This process is illustrated in FIG. 9. As described with respect to 4, the IP registration system 40 controls the registration of new or modified IP data at step 131. The IP data management system 30 then preferably updates the version of the master IP database 66 at step 132 using the version control guidelines 133. Such guidelines decide whether a modification of the database results in a new version or, instead, a new release. The new version is released to users at step 134 by e-mailing a notice to all affected users at step 135. The IP data management system 30 synchronizes the local IP databases 71 with the IP master database 66 at step 136.

Figure 10:
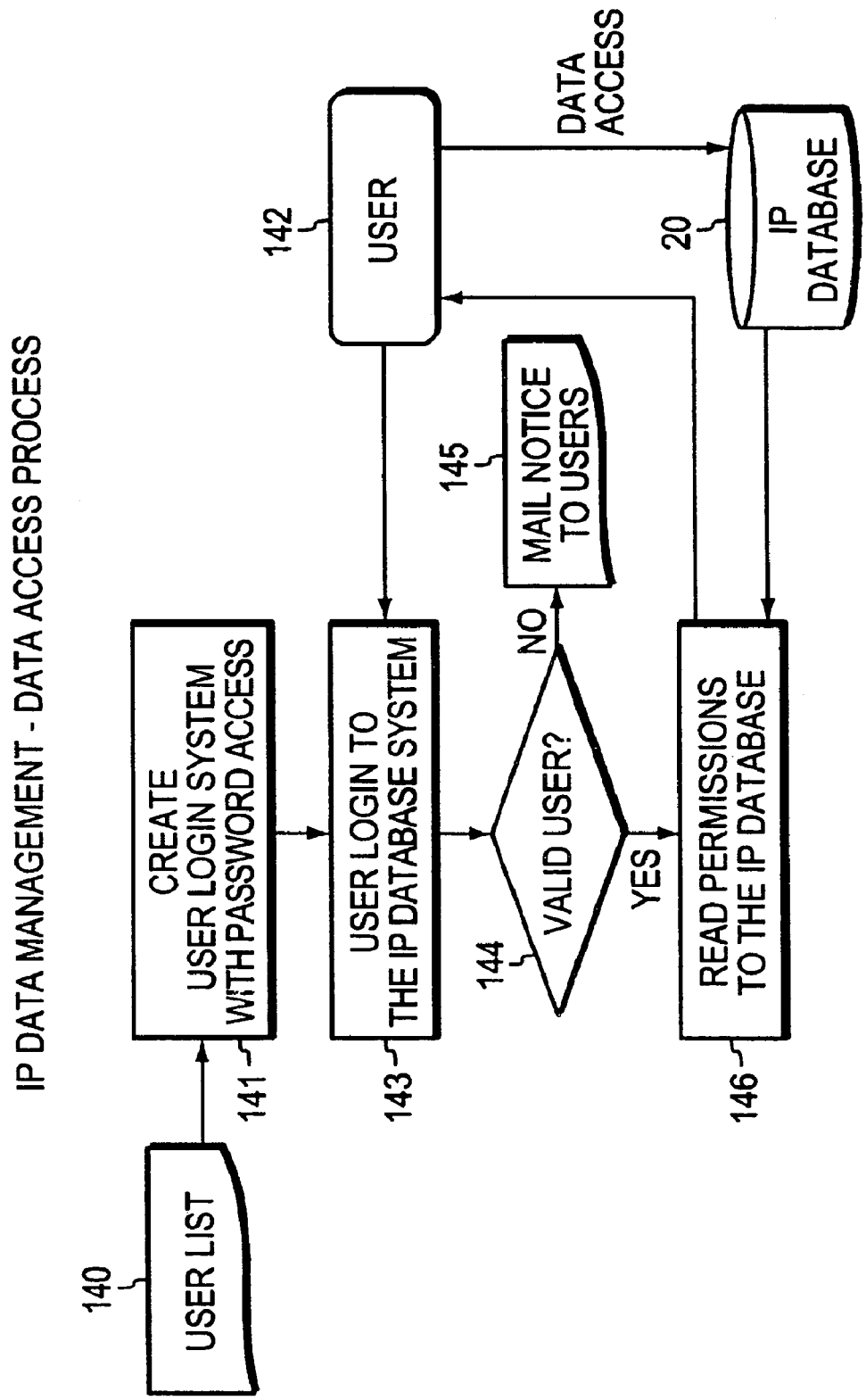
FIG. 10 is a flowchart of a user access process as may be managed by the IP management system.

Finally the IP data management system 30 manages access to the databases (illustrated as a single IP database 20 for convenience) as illustrated in FIG. 10. Using a user list 140, the IP data management system 30 creates a user login system with password access at step 141. Should a user 142 attempt to login to the IP library management system 5 at step 143, the IP data management system 30 determines whether the user has a valid password at step 144. If the user does not, a security notice 145 is e-mailed to all the remaining users. If the user does have a valid password, the IP data management system 30 reads the permissions granted this particular user at step 146. If the user has the required permission, access is granted to the IP database 20.

Advantages of various embodiments as described herein may include one or more of the following;

- Ability to standardize, package and leverage existing and new IPs or design cores and knowledge to dramatically reduce turn-around-time for designs and re-designs;
- Ability for designers to perform analysis during a design process through a secure, qualified catalog browser on both in-house IPs and third party IPs;
- Provision of a secure and robust infrastructure for storage and distribution of pre-qualified IPs (Virtual Components) and "knowledge-ware" (i.e. design guidelines and methodologies) to promote design reuse within the company and to key clients.
- Ability to track IP bugs/issues and usage for various purposes including, for example, quality control and security.

Specific examples of the present invention have been shown by way of example in the drawings and are herein described in detail. It is to be understood, however, that the invention is not to be limited to the particular forms disclosed but to the contrary, the invention is to broadly cover all modifications, equivalents, and alternatives encompassed by the scope of the appended claims.

What is claimed is:

1. A distributed IP library management system for supporting users on a plurality of local area networks coupled through a wide area network, comprising:
    a master IP database for storing virtual component data;
    a master IP database server on a first local area network coupled to the master IP database;
    an IP catalog database for storing attributes pertaining to the virtual component data;
    an IP catalog database server on the first local area network coupled to the IP catalog database;
        an IP data management system for controlling: a) whether a user may access the master IP database and the IP catalog database, b) setup and maintenance of the master IP database and c) updating the master IP database upon registration of virtual component data;
        an IP selection system for browsing the IP catalog database with a query engine and accessing selected virtual component data from the master IP database
        an IP catalog management system for setting up the IP catalog database and for updating the IP catalog database; and
        an IP modification management system for managing the reporting and tracking of errors detected in the virtual component data,
    wherein user terminals on a given local are network couple to the IP library management system through a user interface server on the given local are network.

2. The IP library management system of claim 1, wherein the wide are network is the Internet.

3. The IP library management system of claim 2, wherein the user interface server in any given local area network other than the first local area network couples to a local database server on the given local area network, the local database server coupled to a cached local IP database, and wherein the user interface server on the first local are network couples to the master database server.

4. The IP library management system of claim 3, wherein the IP catalog database is a relational database and the query engine uses SQL commands.

5. The IP management system of claim 4, wherein the IP master database and the IP catalog database are each stored in a Redundant Array of Independent Disks and the IP catalog database server is a cluster server.

* * * * *